(12) United States Patent
Schwab et al.

(10) Patent No.: US 8,858,020 B2
(45) Date of Patent: Oct. 14, 2014

(54) ILLUMINATED DISPLAY FOR REPRESENTING A THREE-DIMENSIONAL OBJECT

(75) Inventors: Tobias Schwab, Ingolstadt (DE); Stephan Berlitz, Schrobenhausen (DE)

(73) Assignee: Audi AG, Ingolstadt (DE)

( * ) Notice: Subject to any disclaimer, the term of this patent is extended or adjusted under 35 U.S.C. 154(b) by 224 days.

(21) Appl. No.: 13/440,424

(22) Filed: Apr. 5, 2012

(65) Prior Publication Data

US 2013/0094205 A1    Apr. 18, 2013

(30) Foreign Application Priority Data

Apr. 6, 2011 (DE) .......................... 10 2011 016 228

(51) Int. Cl.
| | |
|---|---|
| *F21V 7/22* | (2006.01) |
| *B60Q 3/04* | (2006.01) |
| *B60K 35/00* | (2006.01) |
| *B60K 37/06* | (2006.01) |
| *B60Q 3/00* | (2006.01) |
| *F21V 8/00* | (2006.01) |

(52) U.S. Cl.
CPC .............. *F21V 7/22* (2013.01); *H01H 2219/06* (2013.01); *G02B 6/0068* (2013.01); *B60Q 3/044* (2013.01); *B60K 2350/1036* (2013.01); *B60K 35/00* (2013.01); *B60K 2350/2017* (2013.01); *B60K 37/06* (2013.01); *B60K 2350/1012* (2013.01); *G02B 6/006* (2013.01); *B60Q 3/004* (2013.01)
USPC ........................................................ 362/231

(58) Field of Classification Search
CPC ......... F21V 7/22; F21V 23/0442; F21V 3/04; F21V 3/0409; F21V 3/0436; G01B 3/30; G02B 6/006; G02B 6/0065
See application file for complete search history.

(56) References Cited

U.S. PATENT DOCUMENTS

| | | | | |
|---|---|---|---|---|
| 2,560,117 | A | * 7/1951 | Mallary | .......................... 40/443 |
| 5,832,642 | A | * 11/1998 | Dalton | ............................. 40/546 |
| 6,728,464 | B1 | 4/2004 | Waldmann | |
| 8,269,628 | B2 * | 9/2012 | Gagnon et al. | ................ 340/555 |

FOREIGN PATENT DOCUMENTS

| | | |
|---|---|---|
| DE | 299 17 623 U1 | 1/2000 |
| DE | 202 18 291 U1 | 3/2003 |
| DE | 10 2006 003 174 A1 | 7/2007 |
| DE | 10 2006 017 067 A1 | 10/2007 |
| DE | 20 2009 010 133 U1 | 11/2009 |

OTHER PUBLICATIONS

Evonik Roehm GmbH: PLEXIGLAS EndLighten T, Technische Information, Sep. 2010.

* cited by examiner

*Primary Examiner* — Bao Q Truong
(74) *Attorney, Agent, or Firm* — Henry M. Feiereisen LLC

(57) ABSTRACT

An illuminated display for representing a three-dimensional object includes a display element containing the object, wherein information becomes visible when light is coupled into the display element. The display element is transparent. The three-dimensional object is made from a first plastic material having a first refractive index and is partially or completely surrounded by a second plastic material having a second refractive index.

9 Claims, 2 Drawing Sheets

ILLUMINATED DISPLAY FOR REPRESENTING A THREE-DIMENSIONAL OBJECT

CROSS-REFERENCES TO RELATED APPLICATIONS

This application claims the priority of German Patent Application, Serial No. 10 2011 016 228.3, filed Apr. 6, 2011, pursuant to 35 U.S.C. 119(a)-(d), the content of which is incorporated herein by reference in its entirety as if fully set forth herein.

BACKGROUND OF THE INVENTION

The present invention relates to an illuminated display for representing a three-dimensional object, including a display element containing the object, in which the information becomes visible when light is coupled in.

The following discussion of related art is provided to assist the reader in understanding the advantages of the invention, and is not to be construed as an admission that this related art is prior art to this invention.

Illuminated displays are used in different fields, especially where information is to be displayed. This information may have very different forms and may be text information, a pictogram and the like. The illuminated display can also be implemented as a pure information display which is used to represent only information, but may also be combined component, wherein an additional functionality or additional components are associated with the illuminated display, for example in form of a switching unit, which may be operated for example through touch. The illuminated display is thus used to display particular information, and a function associated with the information may then be selected via the switching unit associated with or being a part of the illuminated display. Such combined components, in particular in form of switches, are used for example on machines or in automobiles for simultaneous selecting, in addition to a representation of the information, also functions or operating elements, etc., associated with the information.

The automotive field is used only as an example, where for example a number of the illuminated displays may be provided on the instrument panel, with a switching unit being associated with each display. The illuminated displays may represent, for example, three different functional states of the exterior lighting, for example the parking light via a first illuminated display, the low beam via a second illuminated display and the high beam via a third illuminated display. Each individual operating mode can now be selected by the driver by touching the illuminated display which includes a switching function. This recitation is only exemplary and should not be viewed as limiting.

Typically, illuminated displays, preferably those with associated switching functions, like the displays installed for example in an automobile, are made from a plastic part on which a symbol is imaged in a transparent fashion by light-optics, for example by using a corresponding transparent plastic which is illuminated from behind with an integrated light source and which can be recognized when the light source is switched on. It is also known to design the illuminated display for representing a three-dimensional object which represents the information to be visualized. This object becomes visible when light from a light source is coupled into the display element containing this object, with the object then quasi "floating" in the display element and becoming visible as three-dimensional information. Such display element enabling this three-dimensional representation of object information consists of a totally transparent glass body, which is intentionally "disturbed" in the interior by a laser, meaning that the glass structure is intentionally locally altered. This change is performed in the entire region that forms the object, which is made possible using a suitably controlled laser. By intentionally changing the glass structure, the reflectivity changes locally in the region of the interface between "undisturbed" glass and "disturbed glass. However, the glass on the whole, meaning the display element itself, remains transparent in the un-illuminated state, meaning that the "disturbed" region, i.e. the three-dimensional information object itself, is not visible without the coupled-in light. The object information becomes visible only after light is coupled in, because the coupled-in light is deflected or reflected at the interface due to the structural change, making the three-dimensional object visible, with the object quasi "floating" in the interior of the display element.

The object can be formed in the interior of the display element, i.e. the glass structure of a display element made from glass, can be changed locally by using a laser, because the transparency of the entire display element is not fundamentally changed in spite of the fact that the energy of the coupled-in laser light changes the structure. However, because glass components are not desirable in many areas of technology where illuminated display of the aforedescribed type can be used, in particular in an automobile, their use is precluded.

It would therefore be desirable and advantageous to obviate prior art shortcomings and to provide an improved illuminated display which can be used in many applications for representing a three-dimensional object.

SUMMARY OF THE INVENTION

According to one aspect of the present invention, an illuminated display for representing a three-dimensional object includes a display element having a first plastic material which at least partially reflects the light and forms the three-dimensional object, and a second plastic material which does not reflect the light and partially or completely surrounds the object.

The illuminated display according to the invention is characterized by a display element which is completely made from plastic. Two plastic materials with different reflectivities may be used. An at least partially light-reflecting first plastic material forms the three-dimensional object.

According to an advantageous feature of the present invention, the three-dimensional object, which may also be made of several parts, may now be partially or completely surrounded by the second plastic material which does not reflect the light at all or only to an insignificant degree, wherein no air gap exists at the interface between the two plastic materials. When the object is only partially surrounded, one face of the object, or several faces of the object, may be, for example, covered with the second plastic material. When the object is fully embedded, the object is completely surrounded without any air gap. The first plastic material is, as far as permitted by its reflectivity, mostly transparent, wherein the second plastic material is fully transparent, meaning that the first plastic material, i.e. the three-dimensional object, is not visible at all or only barely visible in the display element. The object becomes visible only when light from an external light source is coupled in, because the first plastic material, i.e. the object itself, reflects the incident light and the light propagating through the second plastic material. The object therefore appears to "float" under both partial and complete inclusion.

The display element is almost completely transparent without intentionally coupled-in light, meaning in ambient light.

According to another advantageous feature of the present invention, when using of two plastic materials with different reflectivities according to the invention, which are however either fully or mostly transparent, a display element and hence an illuminated display can be produced from plastic. Unlike with a glass body, the object cannot be formed with a laser in a plastic body, because the introduced laser light energy causes the plastic material to fuse or melt at the location of the "disturbance", which may cause coloration of the plastic and loss of transparency. The object would then be visible. However, when using two separate plastic materials, with one plastic material forming the object being partially or completely enclosed in the other plastic material and having a different reflectivity than the surrounding second plastic material, an "induced" disturbance or change in the refractive index is not necessary, making it possible to construct the display element from a plastic material. The illuminated display can then also be employed in areas where glass elements are not possible, for example in an area of an automobile. Both plastic materials have thus the same refractive index, but different reflectivities.

The first and the second plastic material must be transparent to the greatest possible degree, which is always possible for the second plastic material and which depends for the first plastic material on how its reflectivity is generated. Fundamentally, different plastic materials, meaning different types of plastic materials, can be used as long as these are fully or mostly transparent.

According to an advantageous feature of the present invention, both plastic materials may be made from the same basic material; however, one basic material may be doped to produce its reflectivity. The basic material may be doped by adding doping agents in form of mostly homogeneously distributed nanoparticles which "contaminate" the originally transparent basic material, so that the material itself has a more or less pronounced reflectivity compared to the one doped basic material. Advantageous, the basic material forming the object is doped. The transparency of the doped material depends on the doping level, meaning the fraction of nanoparticles in the total volume of the basic material. The fraction of nanoparticles should be as small as possible, so that the object is not or barely visible unless light is intentionally couples in, and becomes clearly visible only when light is intentionally coupled in due to the reflection by the nanoparticles. At the same time, the particle fraction should be large enough so that the object is sufficiently brightly illuminated under intentional incident light and becomes clearly visible.

According to an advantageous feature of the present invention, the basic material may be, for example, PMMA (polymethylmethacrylate), i.e. a fully transparent plastic material. For example, the PMMA "Plexiglass® colorless" from the company Evonik Röhm GmbH can be used as undoped PMMA, for example to form the second basic material, with the PMMA "Plexiglass® EndLighten T" also from Evonik Röhm GmbH being the doped PMMA forming the object. Colorless, light-scattering particles are embedded in this doped PMMA which, unlike the undoped PMMA through which light passes unimpeded through total reflection, scatters and/or reflects the light, thus causing the object to become visible when light is coupled in.

PC (polycarbonate) may also be used as basic material as an alternative to PMMA, wherein one basic material is here doped, while the other basic material is undoped.

When representation of colored information is desired, the plastic materials may be colored while retaining their transparency. For example, suitable particles causing a yellowish or reddish appearance may be added to the plastic materials. However, these materials are still fully transparent.

According to an advantageous feature of the present invention, at least one colored light source, for example a colored LED coupling in light, may be used to represent colored information, thus also allowing a colored representation of information.

According to another advantageous feature of the present invention, at least two light sources may be provided, with one light source emitting white light and the other light source colored light, enabling a white light representation and a colored light representation, depending on which light source is operated. However, one light source emitting white light and several light sources emitting light of different colors may be provided and their light coupled in. For example, in addition to another white LED, an LED emitting blue light, an LED emitting red light, and an LED emitting green light may be associated, thus allowing different color representations, optionally also mixed colors.

According to an advantageous feature of the present invention, the display element may be constructed as a cubic block, wherein the light is coupled in on at least one side, more particularly on two opposing sides. The light may be coupled in directly from the light source(s), i.e. the light source(s) may be arranged directly adjacent to the surfaces. However, the light may also be guided to the coupling faces through optical waveguides, wherein the optical waveguides may be arranged directly at the coupling faces. However, the invention is not limited to the cubic shape of the display element. Instead, the display element may have any shape as long it has the structure according to the invention. The light-coupling faces need not be planar, and may instead have any free form as long as light can be coupled in.

According to another advantageous feature of the present invention, the illuminated display may also include a device for detecting an approach to or a contact with the display element and for triggering an associated switching function. This means that the display element is equipped with a corresponding sensor device or, for example, connected with a following contact switch, which is operated when pressure is applied to the display element, and the like.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
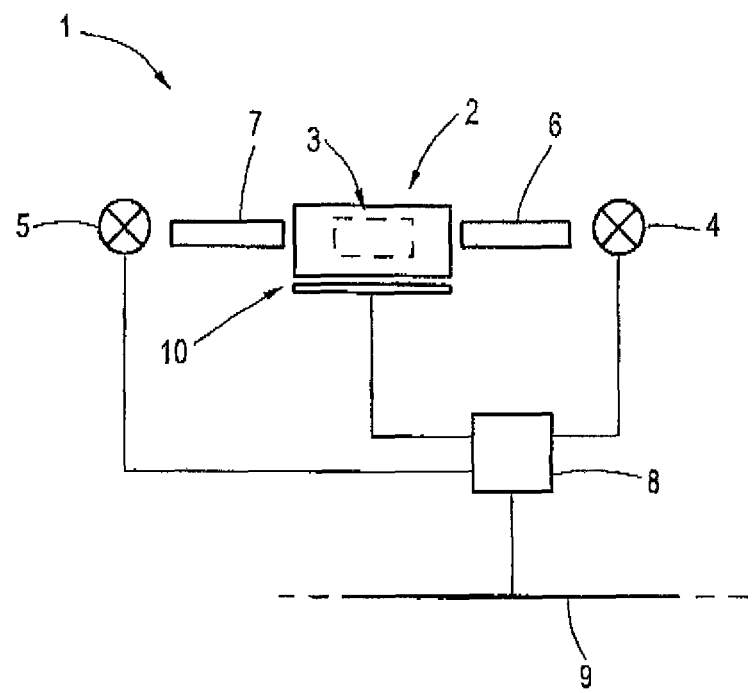
FIG. 1 shows a schematic diagram of a first illuminated display according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
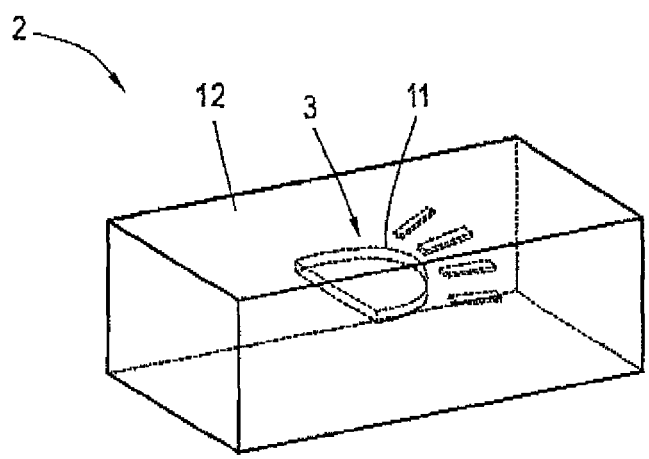
FIG. 2 shows an enlarged schematic diagram of a display element of the illuminated display of FIG. 1 without light coupling.
Figure 3:
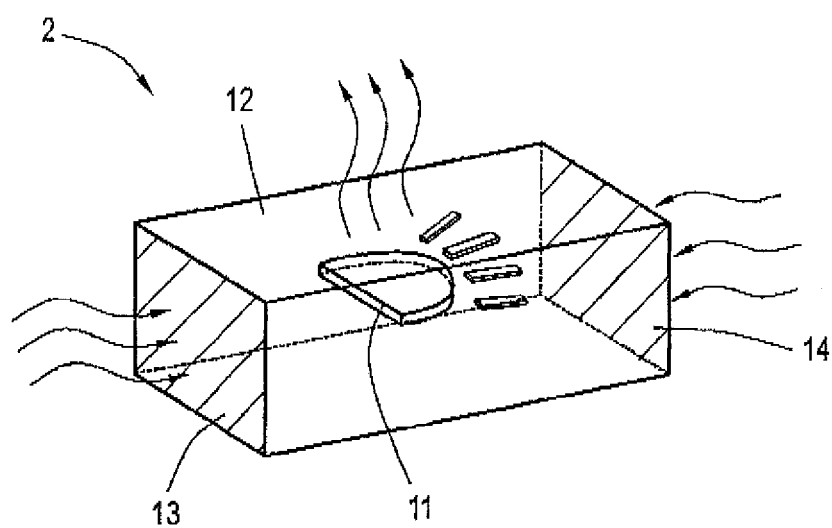
FIG. 3 shows a diagram of the display element of FIG. 2 with light coupling.

Turning now to the drawing, and in particular to FIG. 1, there is shown an illuminated display 1 according to the invention suitable for representing a three-dimensional object. The illuminated display 1 in conjunction with the illumination device includes a display element 2 made from plastic which in the illustrated example, see also FIGS. 2 and 3, is implemented as a simple cubic block. Instead of the block shape, other shapes with an arbitrary geometry and free form surfaces are feasible. A three-dimensional object 3 which is completely enclosed on all sides is received in the interior of the display element 2; the object 3 is not visible when light is not intentionally coupled in, and is therefore shown in FIG. 1 only by a dashed line. This object 3 is made from a first plastic material and is fully enclosed by a second plastic material, as will now be described in greater detail.

Two light sources 4, 5, which are in the illustrated example associated with the display element 2 and optically coupled with the display element 2 via respective optical waveguides 6, 7, so that light emitted by the light sources 4, 5, for example LEDs, is guided via the optical waveguides 6, 7 to the display element 2, where the light can be coupled in at the end faces. The three-dimensional object 3 becomes visible when light is coupled in, which will be described below. The light sources 4, 5 may, for example, both emit white light; however, the light source 4 may also emit white light and the light source 5 may emit colored light, for example red light. Several such light sources may be provided, on one hand, to increase the intensity of the coupled-in light and/or, on the other hand, to display several colors by using differently colored LEDs. The light sources 4, 5 are controlled by a control device 8 which in the illustrated example is arranged on a central bus 9, for example parts of an automobile or of the general engine controller, which however is entirely optional.

In the illustrated exemplary embodiment of FIG. 1, the illuminated display has in addition an associated switching device 10, i.e. the illuminated device 1 and/or the display element 2 are equipped with a switching function. This switching device 10 is used to detect an approach or a contact or a movement of the display element 2, for example by a finger of the driver of the automobile. When this approach/contact/movement is detected, a corresponding signal is transmitted to the control device 8 which then triggers control of the associated switching function by, for example, turning on a low beam or a high beam and the like in the automobile. The switching device 10 can thus be implemented in different ways, as long as it is capable of detecting a switching intent by the operator operating the display element 2.

FIG. 2 shows in from of an enlarged schematic diagram the display element 2 of FIG. 1, which is constructed as a cubic plastic body, as described above. The three-dimensional object 3 which is composed of several parts and represents a low beam diagram in form of a pictogram is located in the interior of the plastic body. The three-dimensional object is made of a first plastic material which is transparent to the greatest possible degree and has a reflectivity or light scattering characteristic affected by doping with nanoparticles. Preferably, a basic material made from PMMA is used, which is doped by adding suitable light scattering particles. However, the object 3 is almost completely transparent without any coupled-in light, and is therefore invisible inside the display element 2.

The object 3 made from the doped PMMA basic material is received in or completely surrounded by a second plastic material 12, without an air gap. This second plastic material 12 is made of the same basic material, i.e. also PMMA, and is therefore completely transparent. However, this second PMMA basic material is not doped, i.e. it does not include additives in form of nanoparticles and the like which alter the light scattering characteristic. The display element 2 is therefore transparent, because both the object 3 produced from the first plastic material 11 made of doped PMMA basic material and the second plastic material 12 made of undoped PMMA basic material are transparent in the absence of separately coupled-in the light, so that the object is completely or almost invisible without intentional light coupling.

FIG. 3 shows the display element 2 of FIG. 2, when light from the light sources 4, 5 is coupled into the display element 2 through the end faces 13, 14. The coupled light is scattered, i.e. reflected, at the object 3 due to the different light scattering characteristics of the plastic 11 compared to the non-light scattering plastic 12. As a result, the object 3 itself becomes visible in the interior of the display element 2, i.e. of the plastic block, and optically "floats" in the cubic display element 2. The operator can accurately recognize the illuminated object 3 due to the transparency of the plastic 12 and identify its information content and, if necessary, perform the associated switching function, if such switching function is provided. However, this switching function, as illustrated in FIG. 1, is entirely optional and need not be provided, and the illuminated display may therefore be used only to represent the object and hence render information.

If colored light is coupled in, the object 3 is commensurately illuminated in color. As an alternative to coupling in colored light, both plastic materials 11, 12 may be colored with the same colored doping material, leaving their transparency unchanged, producing at the end only a single colored plastic display element 2. However, the object 3 then lights up in color when white light is coupled in.

Instead of being completely enclosed, the object may also be only partially enclosed.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An illuminated display for representing a three-dimensional object, comprising a display element having a first plastic material which at least partially reflects the light and forms the three-dimensional object, and a second plastic material which at least partially surrounds the first plastic material and does not reflect the light and partially or completely surrounds the object, wherein the first and the second plastic material are made from the same basic material, and wherein the first basic material is doped with uniformly distributed nanoparticles so as to reflect the light.

2. The illuminated display of claim 1, wherein the basic material is PMMA (polymethylmethacrylate) or PC (polycarbonate).

3. The illuminated display of claim 1, wherein the first and second plastic materials are colored.

4. The illuminated display of claim 1, further comprising at least one light source.

5. The illuminated display of claim 1, wherein the at least one light source comprises a colored light source.

6. The illuminated display of claim 4, comprising at least two light sources, with one of the at least two light sources emitting white light and other of the at least two light sources emitting colored light.

7. The illuminated display of claim 4, wherein the display element is constructed as a cubic block, wherein light from the at least one light source is coupled in on at least one side of the cubic block.

8. The illuminated display of claim 6, wherein light from the at least one light source is coupled in on two opposing sides of the cubic block.

9. The illuminated display of claim 1, further comprising a device for detecting an approach to or a contact with the display element and for triggering an associated switching function.

* * * * *